United States Patent
Iga et al.

(10) Patent No.: US 7,349,032 B2
(45) Date of Patent: Mar. 25, 2008

(54) CIRCUIT TO RESIZE AND ENLARGE AN IMAGE SIGNAL AND RESIZING AND ENLARGEMENT METHOD FOR AN IMAGE SIGNAL

(75) Inventors: Kiichiro Iga, Kasugai (JP); Chihiro Sekiya, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 11/037,265

(22) Filed: Jan. 19, 2005

(65) Prior Publication Data
US 2006/0061601 A1 Mar. 23, 2006

(30) Foreign Application Priority Data
Sep. 17, 2004 (JP) .............................. 2004-272003

(51) Int. Cl.
| | |
|---|---|
| H04N 9/45 | (2006.01) |
| H04N 9/455 | (2006.01) |
| H04N 5/10 | (2006.01) |
| H04N 9/74 | (2006.01) |
| H04N 5/06 | (2006.01) |
| H04N 5/08 | (2006.01) |
| G09G 5/00 | (2006.01) |

(52) U.S. Cl. ...................... 348/581; 348/580; 348/525; 348/530; 348/531; 348/521; 345/660

(58) Field of Classification Search ................ 348/441, 348/580, 581, 525, 530, 531, 540, 544, 629; 345/660
See application file for complete search history.

(56) References Cited

U.S. PATENT DOCUMENTS 5,812,210 A * 9/1998 Arai et al. .................. 348/555
6,049,318 A * 4/2000 Ota .............................. 345/93
6,166,777 A * 12/2000 Ock ............................ 348/565
6,388,711 B1 * 5/2002 Han et al. ................... 348/441
6,466,272 B1 * 10/2002 Arai et al. .................. 348/555
6,650,792 B1 * 11/2003 Aida et al. .................. 382/298
6,654,065 B1 * 11/2003 Sung .......................... 348/525

(Continued)

FOREIGN PATENT DOCUMENTS

JP 59-205665 11/1984

(Continued)

*Primary Examiner*—Brian P. Yenke
(74) *Attorney, Agent, or Firm*—Arent Fox LLP

(57) ABSTRACT

The invention provides an image processing circuit having a capability of performing a reduction (resizing) process and an enlargement process on horizontal-scanning-line data inputted in synchronization with an input horizontal synchronization signal, and subsequently adjusting the horizontal synchronization signals so that the input horizontal-scanning-line data is made transferable to external devices in real time, and an image processing method therefor. A reducing unit thins out n-lines of the input horizontal synchronization signals out of m-lines of the input horizontal synchronization signals HD. When an enlarging unit enlarges the image data by an enlargement ratio k (k: natural number) in the vertical direction, the enlarging unit inserts (k−1) lines of the second horizontal synchronization signals for data transmission EHSYNC2 in the transmitting horizontal-synchronization-signal interval time TC1 between adjacent first horizontal synchronization signals for data transmission EHSYNC1 with predetermined intervals. A composing unit merges the first horizontal synchronization signals for data transmission EHSYNC1 and the second horizontal synchronization signals for data transmission EHSYNC2 to give horizontal synchronization signals for data transmission EHSYNC.

11 Claims, 11 Drawing Sheets

U.S. PATENT DOCUMENTS

| | | | |
|---|---|---|---|
| 7,071,922 B2 * | 7/2006 | Sun et al. | 345/166 |
| 7,148,909 B2 * | 12/2006 | Yui et al. | 345/660 |
| 7,239,355 B2 * | 7/2007 | Smith et al. | 348/521 |
| 7,253,844 B2 * | 8/2007 | Hiltunen et al. | 348/569 |
| 2004/0027500 A1 * | 2/2004 | Davidson et al. | 348/809 |

FOREIGN PATENT DOCUMENTS

| | | |
|---|---|---|
| JP | 61-227477 | 10/1986 |
| JP | 07-129117 | 5/1995 |
| JP | 08-149287 | 6/1996 |
| JP | 10-171440 | 6/1998 |

* cited by examiner

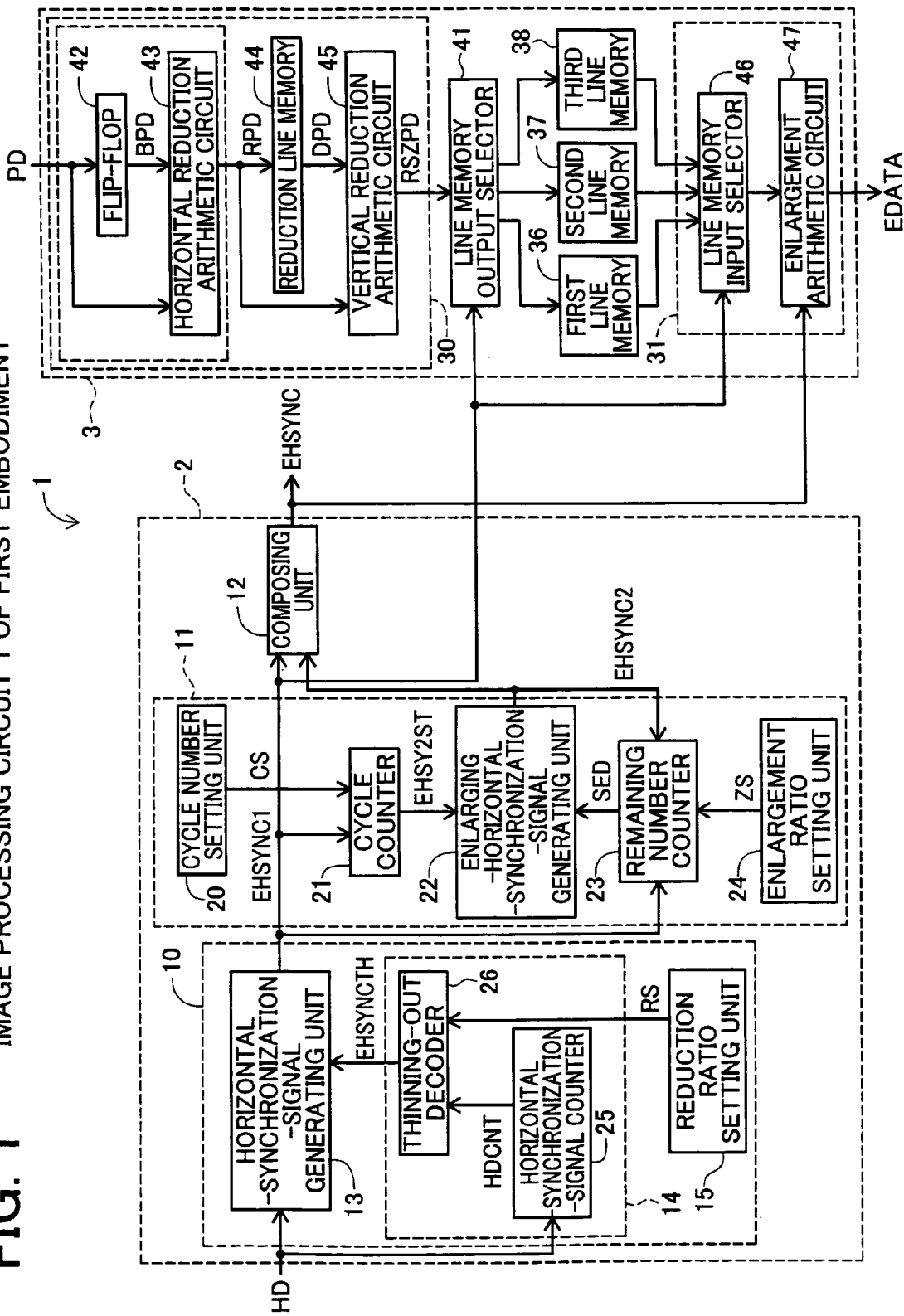
FIG. 1  IMAGE PROCESSING CIRCUIT 1 OF FIRST EMBODIMENT

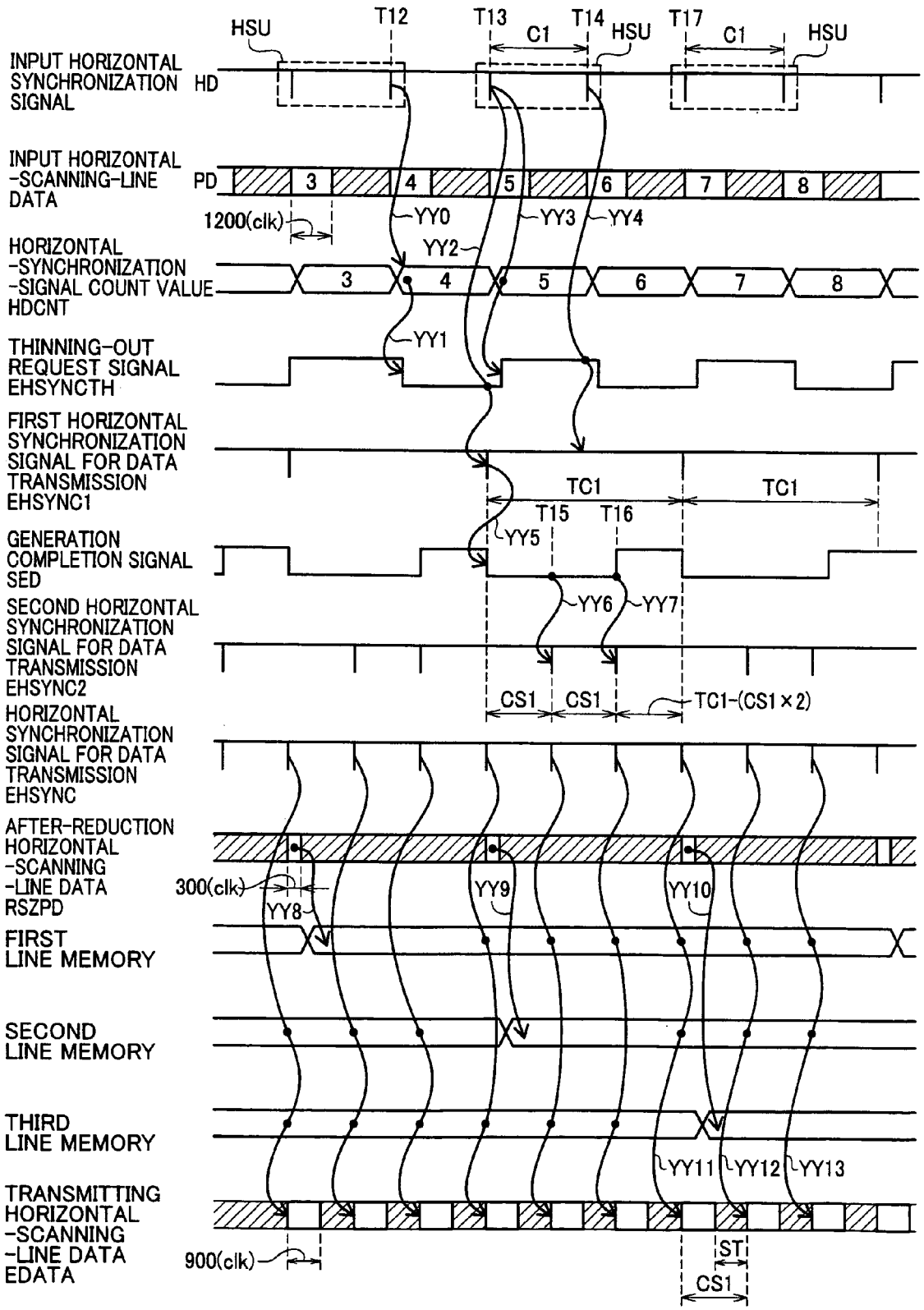
FIG. 2 TIMING CHART OF THE IMAGE PROCESSING CIRCUIT 1 OF THE FIRST EMBODIMENT (FIRST PART OF THE CHART)

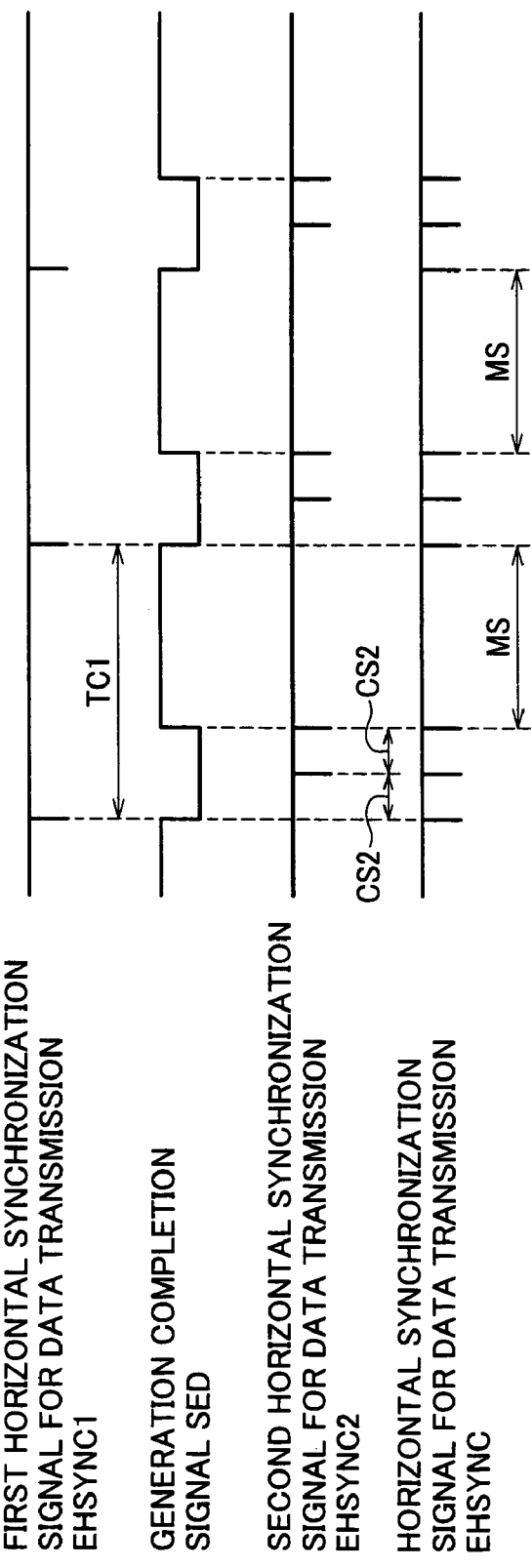
FIG. 3  TIMING CHART OF THE IMAGE PROCESSING CIRCUIT 1 1 IN THE IMAGE PROCESSING CIRCUIT (SECOND PART OF THE CHART)

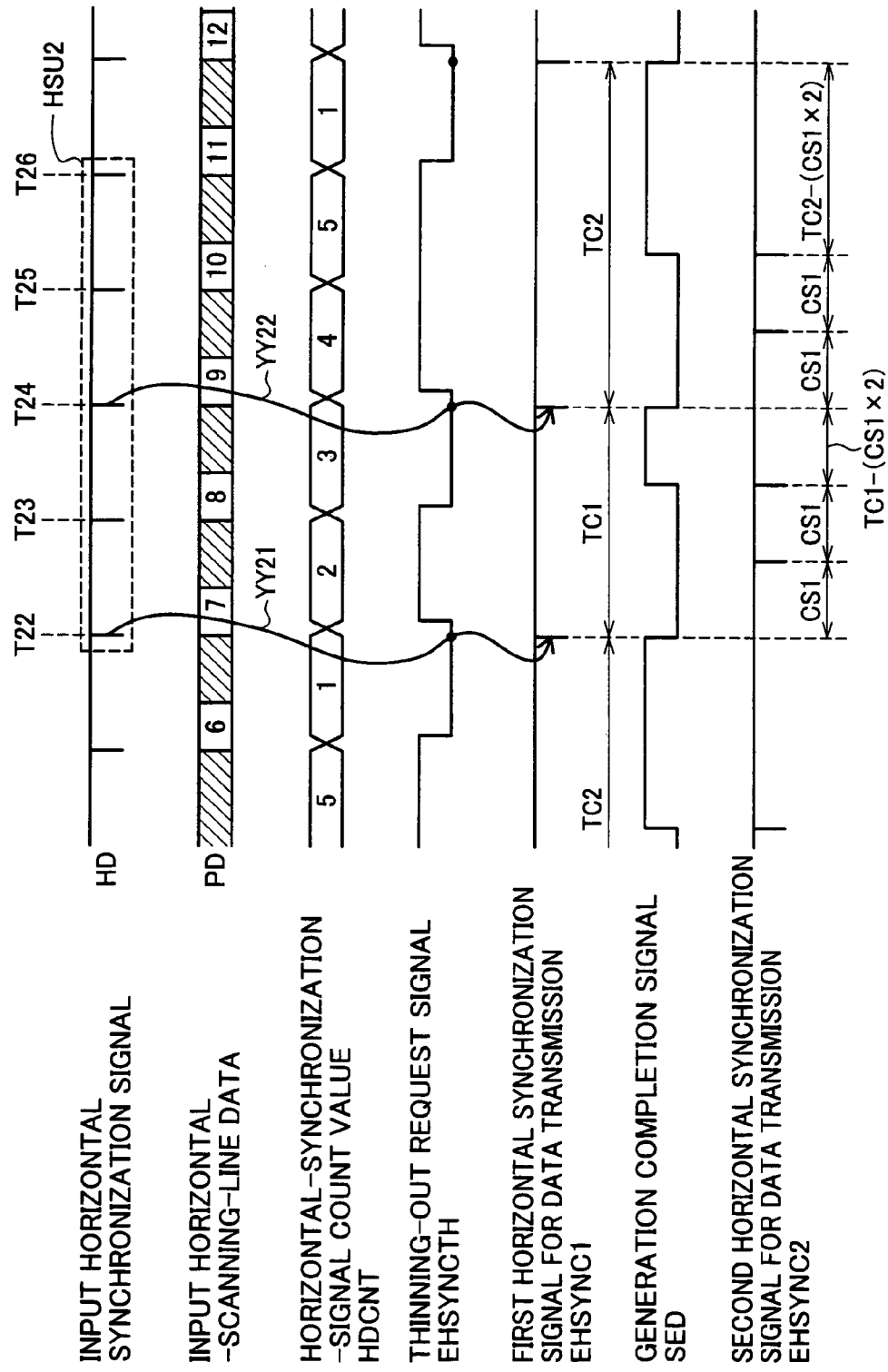
FIG. 4 TIMING CHART OF THE IMAGE PROCESSING CIRCUIT OF SECOND EMBODIMENT

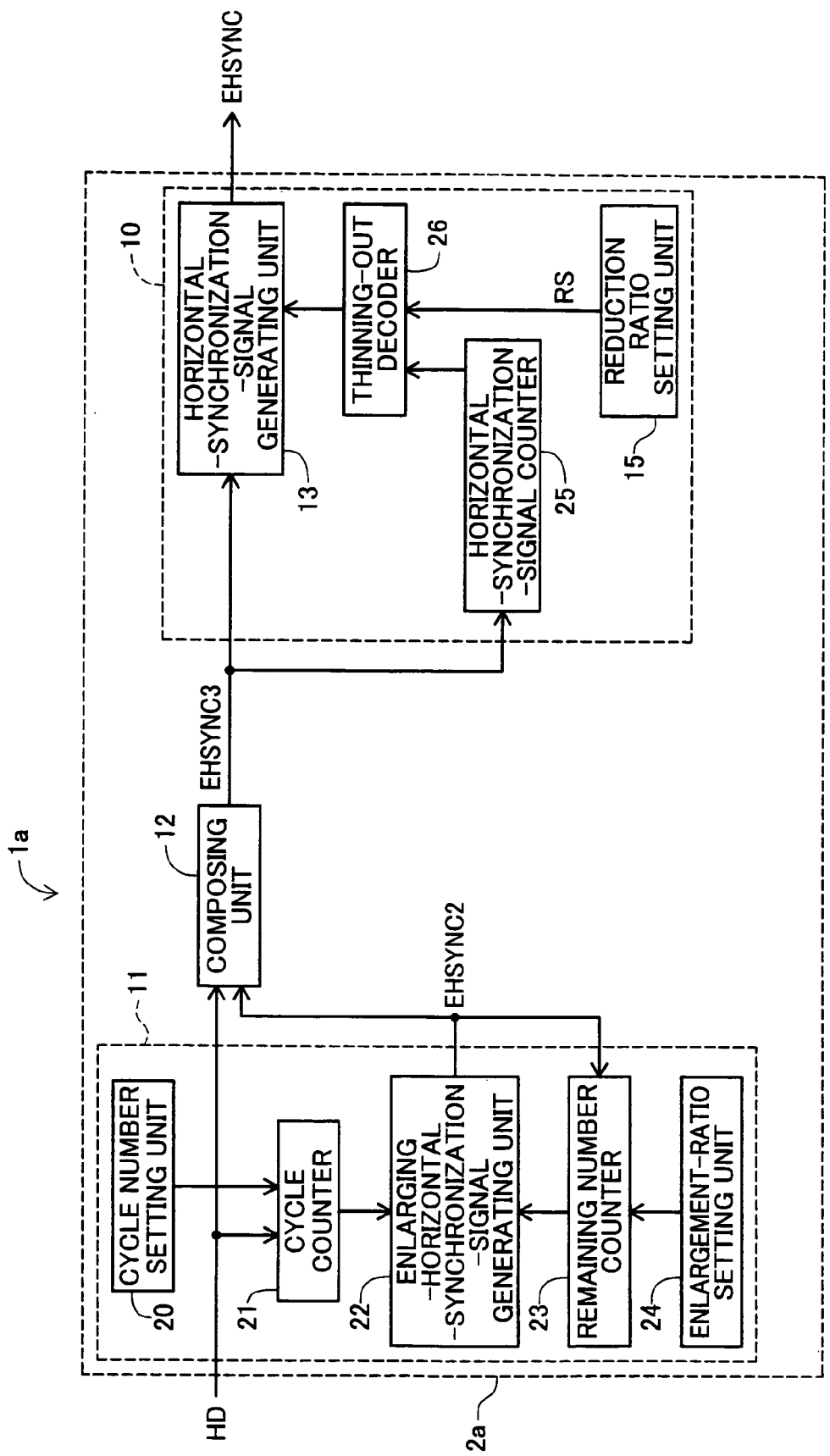
FIG. 5   IMAGE PROCESSING CIRCUIT 1A OF THIRD EMBODIMENT

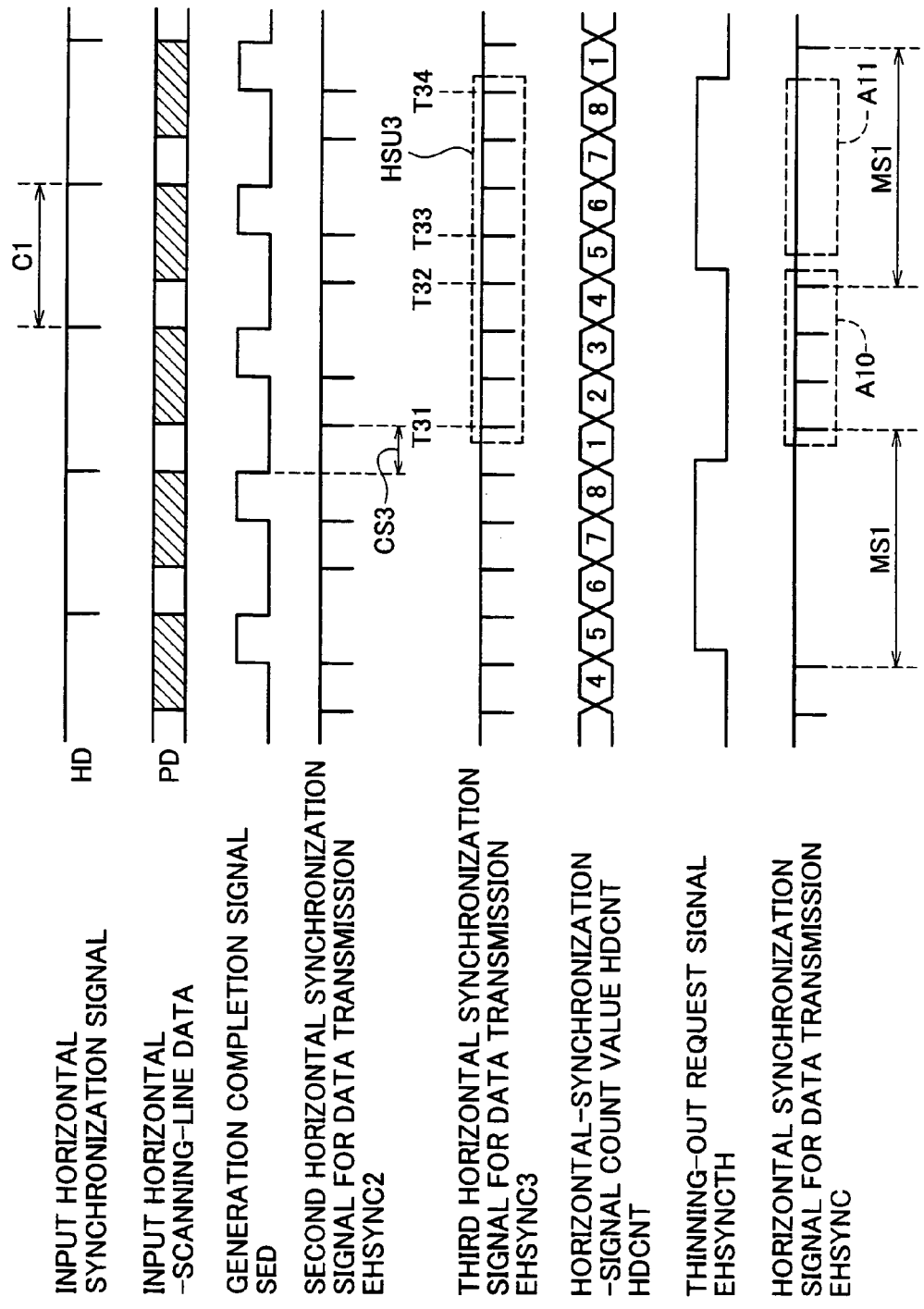
FIG. 6 TIMING CHART OF THE IMAGE PROCESSING CIRCUIT 1A OF THIRD EMBODIMENT

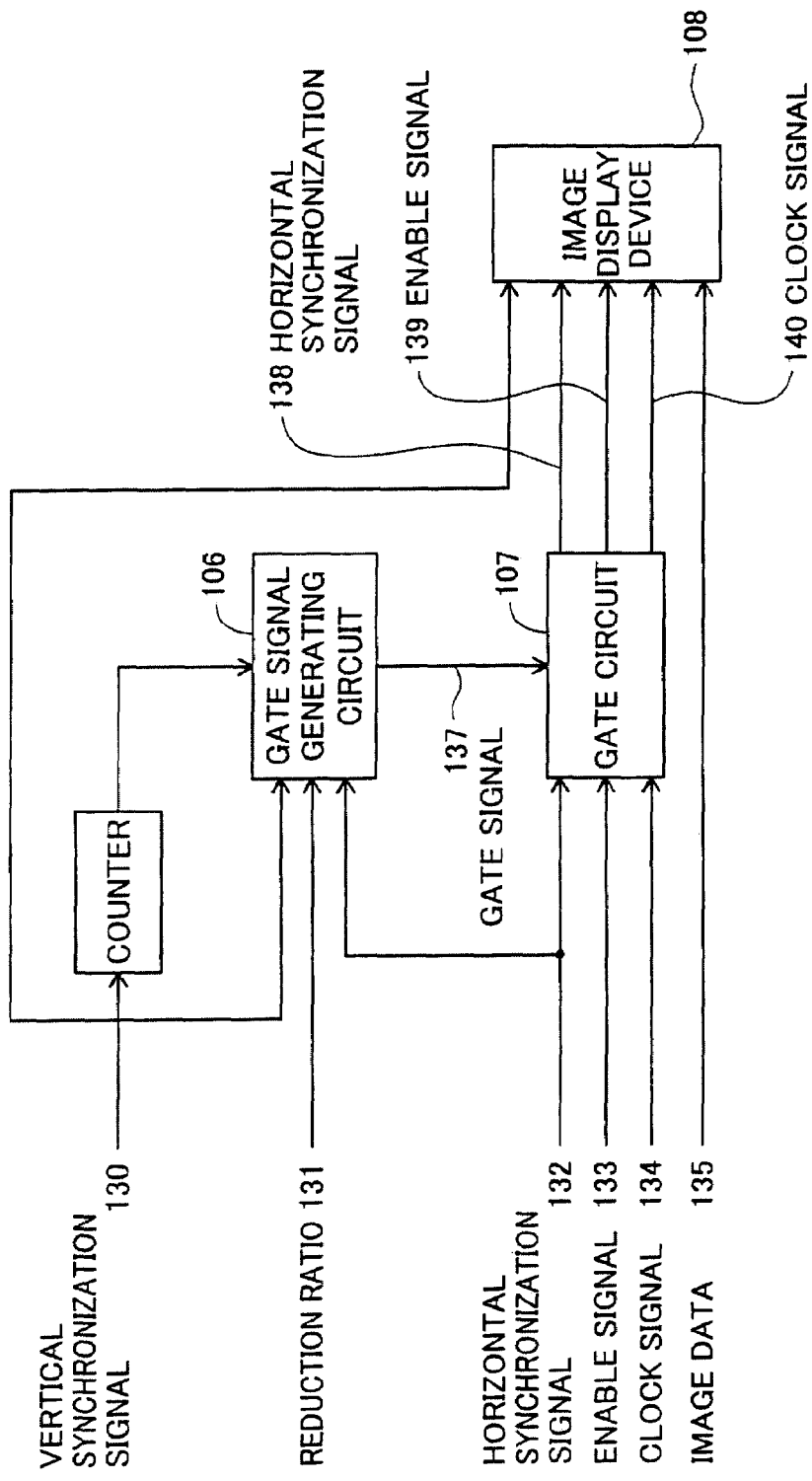
FIG. 7  A VIEW OF THE IMAGE DISPLAY DEVICE ACCORDING TO THE PRIOR ART
PRIOR ART

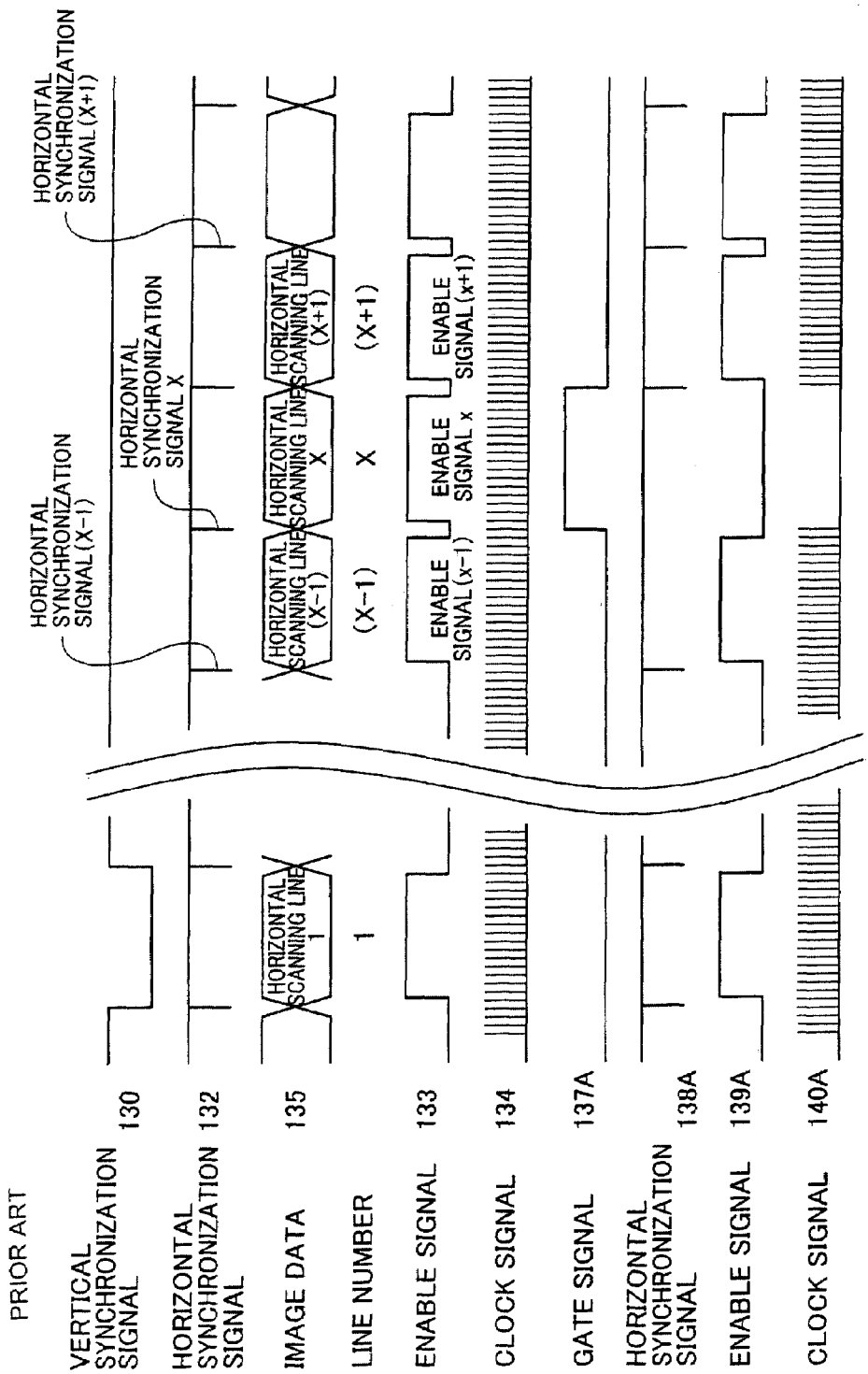
FIG. 8 A VIEW SHOWING OPERATION OF THE IMAGE DISPLAY DEVICE ACCORDING TO THE PRIOR ART
PRIOR ART

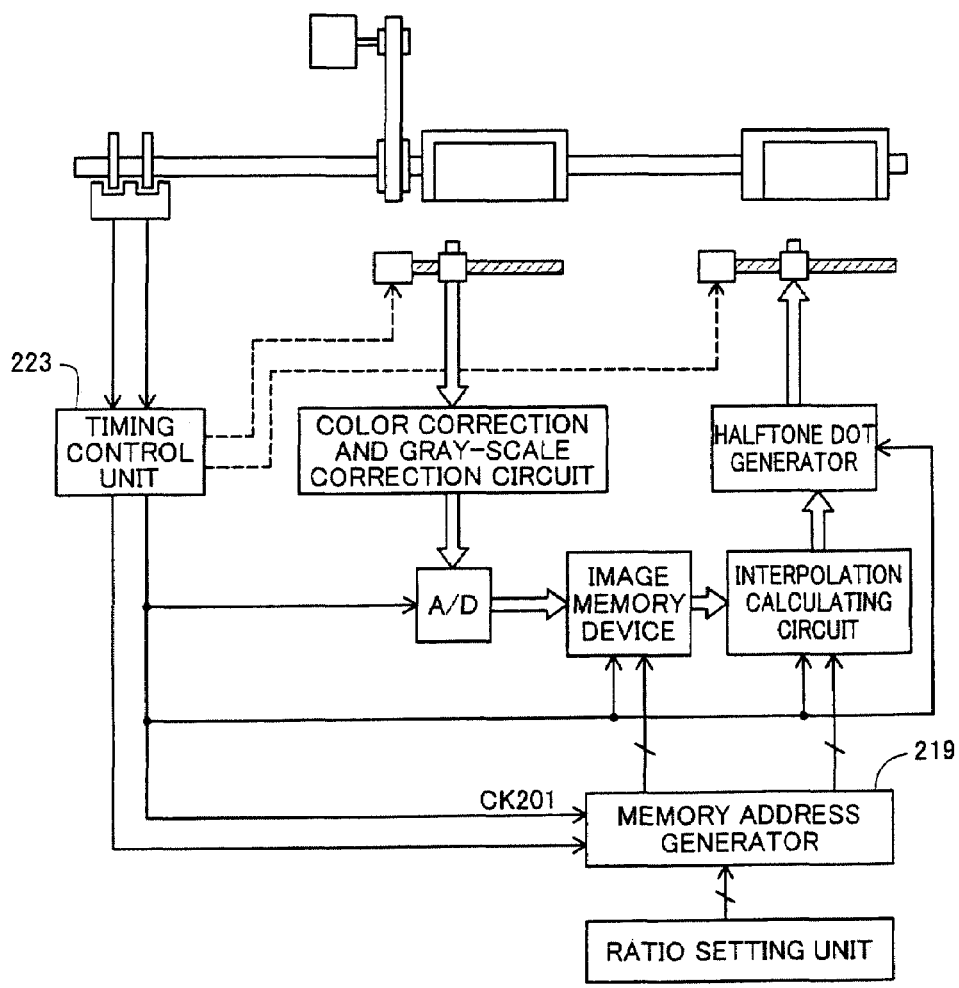
FIG. 9 PRIOR ART  A VIEW OF THE IMAGE DISPLAY DEVICE ACCORDING TO PRIOR ART (SECOND EXAMPLE)

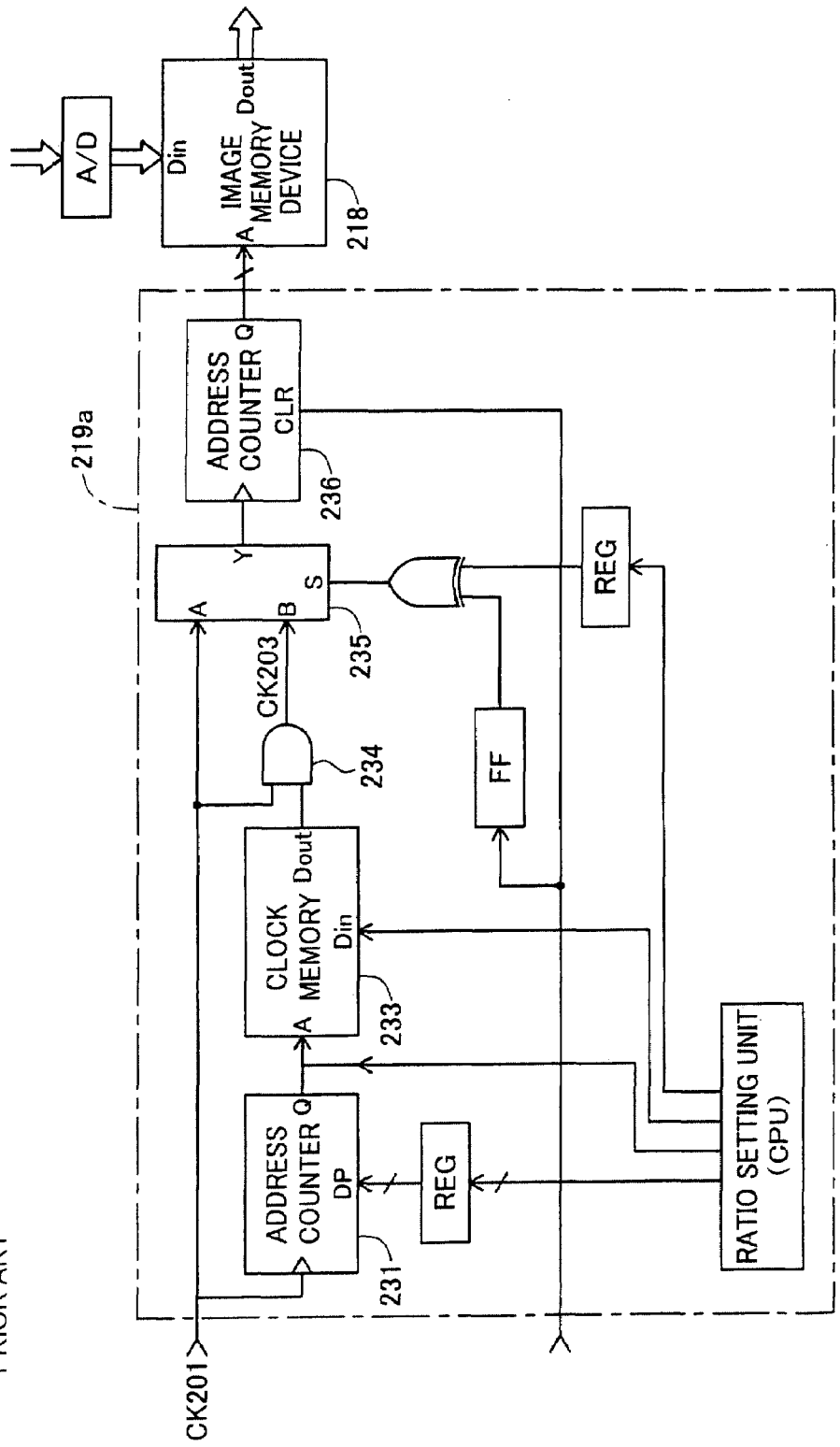
FIG. 10  A VIEW OF THE MEMORY ADDRESS GENERATING UNIT ACCORDING TO PRIOR ART
PRIOR ART

A VIEW SHOWING THE OPERATION OF THE IMAGE PROCESSING SYSTEM (SECOND EXAMPLE)

PRIOR ART    CK201

PRIOR ART    OUTPUT OF CLOCK MEMORY

PRIOR ART    CK203

PRIOR ART    ADDRESS AT THE TIME OF ENLARGING AND WRITING

PRIOR ART    ADDRESS AT THE TIME OF ENLARGING AND READING

CIRCUIT TO RESIZE AND ENLARGE AN IMAGE SIGNAL AND RESIZING AND ENLARGEMENT METHOD FOR AN IMAGE SIGNAL

CROSS-REFERENCE TO RELATED APPLICATIONS

This application is based upon and claims the benefit of priority from the prior Japanese Patent Application No. 2004-272003 filed on Sep. 17, 2004, the entire contents of which are incorporated herein by reference.

BACKGROUND OF THE INVENTION

1. Field of the Invention

The present invention relates to a resizing process and an enlargement process of an inputted image signal, and more specifically, to an image processing circuit and an image processing method for resizing an inputted image signal in conformity to an output destination device (changing the image size) and performing enlarged display.

2. Description of Related Art

The operation of the conventional image processing circuit for resizing image data inputted from an image sensor etc. (performing a process of altering the size of image data in such a way as to fit a device at its destination) and outputting it that is disclosed in Japanese unexamined patent publication No. H10(1998)-171440 will be described using FIG. 7 and FIG. 8 (FIG. 1 and FIG. 2 in that Patent Publication of the prior art). An image display device 108 in FIG. 7 recognizes the head of a horizontal scanning line by an "L" period of a horizontal-synchronization-signal 138 using a rising edge of a clock signal 140 as a reference, and displays image data 135 in an "H" period of an enable signal 139. Suppose the horizontal scanning lines of the image data 135 inputted into the image display device 108 in FIG. 7 are y-lines, and a reduction ratio 131 of the image inputted into a gate-signal generating circuit 106 is y'/y (y': integer). First, as a first operation in an arbitrary frame image, non-consecutive (y'-y)-lines of the horizontal synchronization signals are selected out of y-lines of the horizontal synchronization signals that constitute the image data 135, and designated as a processing line group.

Consider that one selected horizontal scanning line in the processing line group is a horizontal synchronization signal x in FIG. 8. The gate-signal generating circuit 106 generates a horizontal synchronization signal x corresponding to the horizontal scanning line x, an enable signal x, and a gate signal 137A used for performing a thinning-out process on a clock signal group x in a period of the horizontal scanning line x. A gate circuit 107 performs a thinning-out process on control signals of a horizontal synchronization signal 132, an enable signal 133, and a clock signal 134, respectively, and generates a horizontal synchronization signal 138A, an enable signal 139A, and a clock signal 140A.

At this time, the processing line group except the horizontal scanning line x is also subjected to the thinning-out process similarly, that is, the horizontal synchronization signal 132, an enable signal 133, and the clock signal 134 that correspond to the horizontal synchronization signal x are thinned out in the gate circuit 107. The image display device 108 displays the image using the horizontal synchronization signal 138A, the enable signal 139A, the clock signal 140A, and a vertical synchronization signal 130 that are all generated by the above procedure as well as the inputted image data 135. At this time, apart of the image data 135 consisting of the horizontal scanning lines selected as the processing line group is not displayed on the image display device 108 because corresponding control signals have been thinned out in the gate circuit 107. As a result, an image that has been reduced by a reduction ratio y'/y in the vertical direction and hence consists of y'-lines of the horizontal scanning lines will be displayed on the image display device 108.

The operation of another conventional image processing circuit for enlarging image data disclosed in Japanese unexamined patent publication No. S61(1986)-227477 will be described using FIG. 9 through FIG. 11. A pixel clock CK201 from a timing control unit 223 (FIG. 9) is periodically given, as shown in FIG. 11A. An address counter 231 (FIG. 10) counts this pixel clock CK201, and outputs an address signal that increases or decreases by one for each pulse cyclically for every m-pulses of the pixel clock CK201. A clock memory 233 uses this output as its address input, and outputs sequentially the above-mentioned data (FIG. 11B) currently stored at that address. An AND circuit 234 received this data gates the pixel clock CK201 by this data, and generates a clock CK203 in the form such that pulses of the pixel clock CK201 are deleted regularly as shown in FIG. 11C. An address counter 236 generates an address output (FIG. 11D) corresponding to the periodic pixel clock CK201 and gives it to an image memory device 218. Therefore, when writing the image data, original pixel data inputted into this circuit, as it is, is stored in the image memory device 218.

Next, consider a reading operation in the case of enlargement. In doing this, the operation differs from the above-mentioned writing operation in the following points. That is, a selector 235 (FIG. 10) select B input, i.e., a clock CK203. Then, a pulse in the form of FIG. 11C will be given to the address counter 236. As shown in FIG. 11E, at a location where the pulse of the clock CK203 is lost, the same address will be accessed successively. Because of this, reading the image data from the image memory device 218 will be done in such a way that a pixel having the identical content is given two or more times successively in these locations and the next pixel is read out, resulting in an enlarged reproduction of the image.

SUMMARY OF THE INVENTION

However, in the above-mentioned background art, performing a reduction (resizing) process and an enlargement (zooming) process simultaneously is not disclosed. That is, the background art does not disclose concretely a method of resizing image data so that it is converted to data suited to an image display device on which the user intends to display the data and at the same time displaying the image data being enlarged on the image display device on which the user intends to display the data, which gives a problem. In a reduction process, especially when reduction is performed by an arbitrary reduction ratio, such as n/m (times) (n, m: natural numbers, where n<m), there may be a case where the input horizontal scanning lines need to be thinned out uniformly. However, such a thinning-out is not disclosed concretely, which gives a problem.

This invention is devised in order to solve at least one of the problems of the background art. The purpose of this invention is to provide an image processing circuit that is endowed with the capability of performing both a reduction (resizing) process and an enlargement process on input horizontal-scanning-line data flowing incessantly in synchronization with the input horizontal synchronization signal and adjusting the horizontal synchronization signals when transferring the data to external devices, such as a host and a display device, and thereby makes it possible to transfer the data in real time, and an image processing method therefor.

To achieve the purpose of the invention, there is provided an image processing circuit, according to the first invention, into which image data is inputted in synchronization with an input horizontal synchronization signal, comprising: an enlarging circuit that inserts an enlarging horizontal synchronization signal(s) into a signal interval time between adjacent input horizontal synchronization signals; and a reducing circuit that performs a thinning-out process of masking selected input horizontal synchronization signals and/or enlarging horizontal synchronization signals out of an input horizontal-synchronization-signal unit consisting of predetermined number of adjacent input horizontal synchronization signals and/or enlarging horizontal synchronization signals.

Image data is inputted into the image processing circuit according to a first invention in synchronization with the input horizontal synchronization signal. The enlarging circuit enlarges image data by inserting enlarging horizontal synchronization signals into a signal interval time between adjacent input horizontal synchronization signals to increase the horizontal synchronization signals in number. The enlargement process makes it possible, for example, to display enlarged image data on an image display device. The horizontal-synchronization-signal unit consists of a predetermined number of adjacent input horizontal synchronization signals and/or enlarging horizontal synchronization signals. The reducing circuit performs a thinning-out process on the horizontal-synchronization-signal unit by masking the input horizontal synchronization signals and/or the enlarging horizontal synchronization signals that were selected. By the reduction process, resizing can be performed on image data so that, for example, the image data is converted to data suited to the number of pixels of an image display device etc.

In the case of a sequence in which an output of the reducing circuit is inputted into the enlarging circuit, the input horizontal synchronization signals that were thinned out are inputted into the enlarging circuit. On the other hand, in the case of a sequence in which an output of the enlarging circuit is inputted into the reducing circuit, both the input horizontal synchronization signals and the enlarging horizontal synchronization signals are inputted into the reducing circuit.

With this configuration, the reducing circuit that thins out the input horizontal synchronization signals and/or enlarging horizontal synchronization signals and the enlarging circuit that inserts the enlarging horizontal synchronization signals into a signal interval time between adjacent input horizontal synchronization signals are combined, whereby a control of performing the reduction (resizing) process and the enlargement process simultaneously becomes possible.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is an image processing circuit 1 of a first embodiment;

FIG. 2 is a timing chart (first part of the chart) of the image processing circuit 1 of the first embodiment;

FIG. 3 is a timing chart (second part of the chart) of the image processing circuit 1 in the image processing circuit;

FIG. 4 is a timing chart of the image processing circuit 1 of a second embodiment;

FIG. 5 is an image processing circuit 1a of a third embodiment;

FIG. 6 is a timing chart of the image processing circuit 1a of the third embodiment;

FIG. 7 is a view of an image display device in the prior art;

FIG. 8 is a view showing the operation of the conventional image processing system;

FIG. 9 is a view of an image display device (second example) in the prior art;

FIG. 10 is a view of a memory address generating unit of the prior art;

DETAILED DESCRIPTION OF THE PREFERRED EMBODIMENTS

Figure 11A:
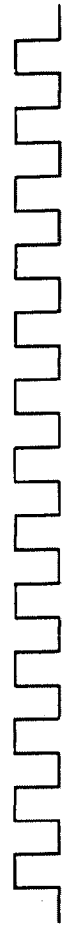
FIG. 11A is a diagram showing a pixel clock CK201 from a timing control unit in the operation of the conventional image processing system (second example)
Figure 11B:
FIG. 11B is a diagram showing data outputted from clock memory in the operation of the conventional image processing system (second example)
Figure 11C:
FIG. 11C is a diagram showing a regularly deleted clock in the operation of the conventional image processing system (second example)
Figure 11D:
FIG. 11D is a diagram showing an address output corresponding to the periodic pixel clock in the operation of the conventional image processing system (second example)
Figure 11E:
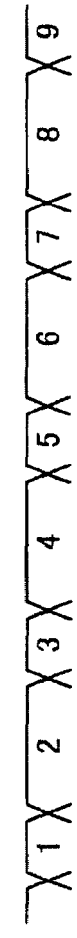
FIG. 11E is a diagram showing an address output corresponding to the regularly deleted clock in the operation of the conventional image processing system (second example).

Hereafter, embodiments materialized for the image processing circuit of the present invention will be described in detail referring to FIG. 1 through FIG. 6.

First Embodiment

A first embodiment of this invention will be described using FIG. 1 through FIG. 3. FIG. 1 shows an image processing circuit 1 of the first embodiment. The image processing circuit 1 is a circuit that is endowed with a capability of performing internally both the reduction (resizing) process and the enlargement process on input horizontal-scanning-line data PD flowing incessantly in synchronization with the input horizontal synchronization signal HD and subsequently adjusting the horizontal synchronization signals when the data is transferred to external devices, such as a host and a display device, and thereby makes it possible to transfer the data in real time.

The image processing circuit 1 comprises a horizontal-synchronization-signal output unit 2 and an image-signal output unit 3. The horizontal-synchronization-signal output unit 2 outputs a horizontal synchronization signal for data transmission EHSYNC. The image-signal output unit 3 outputs transmitting horizontal-scanning-line data EDATA.

The horizontal-synchronization-signal output unit 2 comprises a reducing unit 10, an enlarging unit 11, and a composing unit 12, wherein an output of the reducing unit 10 is inputted into the enlarging unit 11. Moreover, a first horizontal synchronization signal for data transmission EHSYNC1 outputted from the reducing unit 10 and a second horizontal synchronization signal for data transmission EHSYNC2 outputted from the enlarging unit 11 are inputted into the composing unit 12.

The reducing unit 10 comprises a horizontal-synchronization-signal generating unit 13, a line number counter unit 14, and a reduction-ratio setting unit 15. The line number counter unit 14 comprises a horizontal-synchronization-signal counter 25 and a thinning-out decoder 26. The reduction-ratio setting unit 15 outputs a reduction-ratio set value RS. The input horizontal synchronization signal HD is inputted into the horizontal-synchronization-signal counter 25. The horizontal-synchronization-signal counter 25 outputs a horizontal-synchronization-signal count value HDCNT. The horizontal-synchronization-signal count value HDCNT and the reduction-ratio set value RS are inputted into the thinning-out decoder 26. The thinning-out decoder 26 outputs a thinning-out request signal EHSYNCTH.

The thinning-out request signal EHSYNCTH and the input horizontal synchronization signal HD are inputted into the horizontal-synchronization-signal generating unit 13. The horizontal-synchronization-signal generating unit 13 outputs the first horizontal synchronization signal for data transmission EHSYNC1. The horizontal-synchronization-signal generating unit 13 is provided with the same operation as the OR gate. When a low level thinning-out request signal EHSYNCTH is inputted, the horizontal-synchronization-signal generating unit 13 outputs the input synchronization signal HD that is a low level pulse signal as the first horizontal synchronization signal for data transmission EHSYNC1. When a high level thinning-out request signal EHSYNCTH is inputted, the horizontal-synchronization-signal generating unit 13 performs a thinning-out process of masking the input synchronization signal HD that is a low level pulse signal.

The enlarging unit 11 comprises a cycle-number setting unit 20, a cycle counter 21, an enlarging-horizontal-synchronization-signal generating unit 22, a remaining number counter 23, and an enlargement-ratio setting unit 24. The cycle-number setting unit 20 outputs the cycle-number set value CS, which is inputted into the cycle counter 21. The cycle counter 21 outputs an enlarging-horizontal-synchronization-signal outgoing signal EHSY2ST, which is inputted into the enlarging-horizontal-synchronization-signal generating unit 22. The enlargement-ratio setting unit 24 outputs the horizontal-synchronization-signal insert-number set value ZS, which is inputted into the remaining number counter 23. The remaining number counter 23 outputs a generation completion signal SED, which is inputted into the enlarging-horizontal-synchronization-signal generating unit 22. The enlarging-horizontal-synchronization-signal generating unit 22 is provided with the same operation as the OR gate. When a low level generation completion signal SED is inputted, the enlarging-horizontal-synchronization-signal generating unit 22 outputs a second synchronization signal for data transmission EHSYNC2 that is a low level pulse signal. When a high level generation completion signal SED is inputted, the enlarging-horizontal-synchronization-signal generating unit 22 performs a thinning-out operation of masking the enlarging-horizontal-synchronization-signal outgoing signal EHSY2ST that is a low level pulse signal.

The image signal output unit 3 comprises a reduction arithmetic unit 30, a line memory output selector 41, first line memory 36, second line memory 37, third line memory 38, and an enlargement operation unit 31. The reduction operation unit 30 comprises a flip-flop 42, a horizontal-synchronization-signal circuit 43, reduction line memory 44, and a vertical reduction arithmetic circuit 45. The enlargement operation unit 31 comprises a line memory input selector 46 and an enlargement arithmetic circuit 47. The input horizontal-scanning-line data PD is inputted into the flip-flop 42. The input horizontal-scanning-line data PD and delayed horizontal-scanning-line bit data BPD outputted from the flip-flop 42 are inputted into a horizontal reduction arithmetic circuit 43. Reduced horizontal-scanning-line data RPD outputted from the horizontal reduction arithmetic circuit 43 is inputted into the reduction line memory 44. The reduced horizontal-scanning-line data RPD and the delayed horizontal scanning line data DPD outputted from the reduction line memory 44 are inputted into the vertical reduction arithmetic circuit 45. The after-reduction horizontal-scanning-line data RSZPD outputted from the vertical reduction arithmetic circuit 45 and the first horizontal synchronization signal for data transmission EHSYNC1 outputted from the horizontal-synchronization-signal generating unit 13 are inputted into the line memory output selector 41. Output data of the line memory output selector 41 is inputted into the line memory input selector 46 through the first line memory 36, the second line memory 37, and the third line memory 38. The first horizontal synchronization signal for data transmission EHSYNC1 outputted from the horizontal-synchronization-signal generating unit 13 is inputted into the line memory input selector 46. Output data of the line memory input selector 46 and the horizontal synchronization signal for data transmission EHSYNC outputted from the composing unit 12 are inputted into the enlargement arithmetic circuit 47. The enlargement arithmetic circuit 47 outputs transmitting horizontal-scanning-line data EDATA.

The action of the image processing circuit 1 will be described using FIG. 1. Image data that has a predetermined number of the input horizontal-scanning-line data PD being in synchronization with the input horizontal synchronization signal HD is inputted into the image processing circuit 1. The first embodiment is an embodiment in which the image processing circuit 1 controls both the horizontal synchronization signal for data transmission EHSYN and the transmitting horizontal-scanning-line data EDATA so that the reduction (resizing) process is performed on the input horizontal-scanning-line data PD and subsequently the enlargement (zooming) process is performed on that data.

The case where the resizing (reduction) ratios are 1/4 (times) in the horizontal direction and 1/2 (times) in the vertical direction, and the enlargement ratio is 3 (times) both in the horizontal direction and in the vertical direction will be explained. The user etc. sets the reduction ratios and the enlargement ratios in advance by means of an interface not shown in the figure etc., and the enlargement ratio setting unit 24 and the reduction ratio setting unit 15 hold the ratios, respectively. The input horizontal-scanning-line data PD includes data corresponding to data clocks of 1200 (clk).

The action of the reducing unit 10 will be explained. In this embodiment, the reduction ratio of the inputted image data is 1/2 (times) in the vertical direction. Consequently, every two adjacent lines of the input horizontal synchronization signals HD constitute a horizontal-synchronization-signal unit HSU (FIG. 2). The reduction-ratio set value RS corresponding to the reduction ratio (1/2) is set in a register of the reduction-ratio setting unit 15. The reduction-ratio set value RS is a value for indicating a predetermined identification position of the input horizontal synchronization signal HD that is a subject of the thinning-out process in the input horizontal-synchronization-signal unit HSU. In this embodiment, since the reduction ratio of the inputted image data is 1/2 (times) in the vertical direction, the reduction-ratio setting unit 15 holds the reduction-ratio set value RS indicating that every horizontal synchronization signal whose horizontal-synchronizing-signal count value HDCNT is an odd number (i.e., the least bit is 1) should be thinned out.

The horizontal-synchronization-signal counter 25 performs an operation of identifying each input horizontal synchronization signal HD by counting the number of the input horizontal synchronization signals HD that are inputted. Here, this operation will be explained taking a case where the horizontal-synchronization-signal count value HDCNT is 4 at time T12 in FIG. 2. At time T12, when the input horizontal synchronization signal HD is inputted into the horizontal-synchronization-signal counter 25, the horizontal-synchronization-signal count value HDCNT is incremented to 4 from 3 (Arrow YY0). The horizontal-synchronization-signal count value HDCNT is inputted into the thinning-out decoder 26, and compared with the reduction-ratio set value RS by a comparator not shown in the figure. Since the parity of the horizontal-synchronization-signal count value HDCNT do not coincide with that of the reduction-ratio set value RS, the thinning-out request signal EHSYNCTH is set low (thinning-out being inhibited) (Arrow YY1).

Next, at time T13, since the thinning-out request signal EHSYNCTH is low, in response to the input horizontal synchronization signal HD being inputted into the horizontal-synchronization-signal generating unit 13, the horizontal-synchronization-signal generating unit 13 outputs the first horizontal synchronization signal for data transmission EHSYNC1 (Arrow YY2). Moreover, at time T13, the horizontal-synchronization-signal count value HDCNT is incremented to 5, inputted into the thinning-out decoder 26, and compared to the reduction-ratio set value RS, whereby the thinning-out request signal EHSYNCTH is set high (thinning-out being requested) (Arrow YY3).

Next at time T14, since the thinning-out request signal EHSYNCTH is high, even when the input horizontal synchronization signal HD is inputted into the horizontal-synchronization-signal generating unit 13, the horizontal-synchronization-signal generating unit 13 does not output the first horizontal synchronization signal for data transmission EHSYNC1 (Arrow YY4) That is, the thinning-out process is performed.

Repeating the same operation makes it possible to generate the first horizontal synchronization signal for data transmission EHSYNC1 such that one input horizontal synchronization signal HD is thinned out from every input horizontal-synchronization-signal unit HSU consisting of two adjacent lines of the input horizontal synchronization signals HD. Accordingly, reduction (resizing) of the image data by a factor of 1/2 is realized in the vertical direction.

The operation of the enlarging unit 11 will be described. The enlarging unit 11 is a circuit for enlarging the reduced (resized) image data in the vertical direction. First, the enlargement-ratio setting unit 24 sets a horizontal-synchronization-signal insert-number set value ZS. Here, in order to enlarge the inputted image data by an enlargement ratio k (k: natural number) in the vertical direction, all that is necessary is just to insert (k−1) lines of the second horizontal synchronization signal for data transmission EHSYNC2 into the transmitting horizontal-synchronization-signal interval time TC1 between the first horizontal synchronization signals for data transmission EHSYNC1 adjacent to each other. Since the vertical enlargement ratio is 3 (times) in this embodiment, the horizontal-synchronization-signal insert-number set value ZS is set to 2 (times), which indicates that two lines of the second horizontal synchronization signals for data transmission EHSYNC2 should be inserted in the transmitting horizontal-synchronization-signal interval time TC1. Here, the transmitting horizontal-synchronization-signal interval time TC1 is a time corresponding to data clocks of 1526×4=6104 (clk)

The cycle-number setting unit 20 sets a cycle-number set value CS. The cycle-number set value CS is a clock cycle value of the data clock that determines a predetermined interval of insertion time when the second horizontal scanning signal for data transmission EHSYNC2 is inserted in the transmitting horizontal-synchronization-signal interval time TC1. Incidentally, the cycle-number set value CS can be set arbitrarily. Here, the case of setting a cycle-number set value CS1 at which the second horizontal synchronization signals for data transmission EHSYNC2 have a maximum time interval will be explained. The cycle-number set value CS1 in this case is set to a value that divides equally the transmitting horizontal-synchronization-signal interval time TC1 of the first horizontal signal for data transmission EHSYNC1 according to an enlargement ratio of 3. More specifically, the cycle-number set value CS1 is set to a value, the number of data clocks of 2034 (clk), that is a quotient obtained by dividing the number of data clocks of the transmitting horizontal-synchronization-signal interval time TC1 (1526×4=6104 (clk)) by an enlargement ratio of 3.

At time T13 in FIG. 2, when the first horizontal synchronization signal for data transmission EHSYNC1 is inputted into the cycle counter 21 (FIG. 1), the cycle counter 21 starts to count the data clock after being reset. Moreover, at time T13, when a pulse signal of the first horizontal synchronization signal for data transmission EHSYNC1 is inputted into the remaining number counter 23, the generation completion signal SED is reset low (Arrow YY5).

At time T15, when the count value of the cycle counter 21 coincides with the set value (2034 (clk)) of the cycle-number set value CS1, the cycle counter 21 outputs the enlarging-horizontal-synchronization-signal outgoing signal EHSY2ST to the enlarging-horizontal-synchronization-signal generating unit 22, and the count value of the cycle counter 21 is reset. Then, at time T15, the generation completion signal SED is low, informing that the second horizontal synchronization signal for data transmission EHSYNC2 is in a generation non-completion state. Because of this, the enlarging-horizontal-synchronization-signal generating unit 22 outputs the second horizontal synchronization signal for data transmission EHSYNC2 in response to the enlarging-horizontal-synchronization-signal outgoing signal EHSY2ST (Arrow YY6). That is, when the count value of the of the cycle counter 21 coincides with the cycle-number set value CS1, the predetermined interval of insertion time when the second horizontal synchronization signal for data transmission EHSYNC2 is inserted thereinto is determined as the cycle-number set value CS1.

The transmitted second horizontal synchronization signal for data transmission EHSYNC2 is inputted into the remaining number counter 23. The remaining number counter 23 is a counter for setting the number of insertions of the second horizontal synchronization signal for data transmission EHSYNC2 for one line of the first horizontal synchronization signal for data transmission EHSYNC1. The count value of the remaining number counter 23 is initialized to zero by an input of the first horizontal synchronization signal for data transmission EHSYNC1. Then, the count number is incremented by one each time the second horizontal synchronization signal for data transmission EHSYNC2 is inputted, thus indicating "1".

Next, at time T16 when the count value of the cycle counter 21 coincides with the cycle-number set value CS1 again, the cycle counter 21 outputs a second round of the enlarging-horizontal-synchronization-signal outgoing signal EHSY2ST to the enlarging-horizontal-synchronization-signal generating unit 22. At this time, the generation completion signal SED is low, and consequently the enlarging-horizontal-synchronization-signal generating unit 22 outputs a second round of the second horizontal synchronization signal for data transmission EHSYNC2 (Arrow YY7). The counter value of the remaining number counter 23 is incremented by 1 by the second horizontal synchronization signal for data transmission EHSYNC2 being inputted thereinto, indicating "2". When the count values indicates "2", this value coincides with a value of the horizontal-synchronization-signal insertion-number set value ZS (in this embodiment, 2 times), and consequently the generation completion signal SED is set high. Therefore, completion of insertion is notified to the enlarging-horizontal-synchronization-signal generating unit 22.

Repeating the same operation after this in the enlarging unit 11 makes it possible to insert two lines of the second horizontal synchronization signals for data transmission EHSYNC2 so that they divide the transmitting horizontal-synchronization-signal interval time TC1 between the adjacent first horizontal synchronization signals for data transmission EHSYNC1 into three times each having a maximum time interval. In this case, if the reduction process and the enlargement process are simply combined, it goes with tripartite division of the signal interval time C1 of the input horizontal synchronization signals before the reduction process, which makes it impossible to set a time between the second horizontal synchronization signals for data transmission EHSYNC2 to be inserted to a sufficiently long time. Unlike this, since in this embodiment, the transmitting horizontal-synchronization-signal interval time TC1 of the first horizontal synchronization signal for data transmission EHSYNC1 after the reduction process is used as a reference, and divided into three, it becomes possible to set a time between the second horizontal synchronization signals for data transmission EHSYNC2 to a sufficiently long time. That is, it becomes possible to optimize the cycle-number set value CS1 to be a maximum value for the first horizontal synchronization signal for data transmission EHSYNC1. Thus, in this embodiment, a spare time ST (FIG. 2) that allows the transmitting horizontal-scanning-line data EDATA to be enlarged in the horizontal direction can be obtained sufficiently, and hence increasing the horizontal enlargement ratio becomes possible.

The operation of the composing unit 12 (FIG. 1) will be explained. The first horizontal synchronization signal for data transmission EHSYNC1 and the second horizontal synchronization signal for data transmission EHSYNC2 are inputted into the composing unit 12. The composing unit 12 performs the same operation as the AND gate. That is, the composing unit 12 composes a signal by ANDing the first horizontal synchronization signal for data transmission EHSYNC1 with the second horizontal synchronization signal for data transmission EHSYNC2, and outputs the signal thus composed as a horizontal synchronization signal for data transmission EHSYNC (FIG. 2). Thereby, it is possible to obtain the horizontal synchronization signal for data transmission EHSYNC (FIG. 2) such that the second horizontal synchronization signals for data transmission EHSYNC2 are inserted between the first horizontal synchronization signals for data transmission EHSYNC1 at a ratio of EHSYNC1:EHSYNC2=1:2. That is, threefold enlargement of the image data in the vertical direction becomes possible.

The operation of the image signal output unit 3 will be described. The input horizontal-scanning-line data PD is inputted into the image signal output unit 3. Moreover, the first horizontal synchronization signal for data transmission EHSYNC1 and the horizontal synchronization signal for data transmission EHSYNC are inputted into the image signal output unit 3 from the input horizontal-synchronization-signal generating unit 13. The image signal output unit 3 outputs the transmitting horizontal-scanning-line data EDATA. The reduction arithmetic unit 30 provided in the image signal output unit 3 performs the reduction process on the input horizontal-scanning-line data PD. Horizontal reduction is done by the flip-flop 42 and the horizontal reduction arithmetic circuit 43, and vertical reduction is done by the vertical reduction arithmetic circuit 45.

The input horizontal-scanning-line data PD is inputted into the flip-flop 42 and the horizontal reduction arithmetic circuit 43. The flip-flop 42 outputs the delayed horizontal-scanning-line bit data BPD that is delayed by predetermined clock cycle numbers, which is inputted into the horizontal reduction arithmetic circuit 43. The horizontal reduction arithmetic circuit 43 performs the reduction process by weighted interpolation, averaging, etc. using both the input horizontal-scanning-line data PD and the delayed horizontal-scanning-line bit data BPD that are inputted. As a result, the input horizontal-scanning-line data PD having the data amount corresponding to data clocks of 1200 (clk) is reduced in the horizontal direction to provide reduced horizontal-scanning-line data RPD having a data amount corresponding to 300 (clk).

The reduction horizontal-scanning-line data RPD is inputted into the reduction line memory 44 and the vertical reduction arithmetic circuit 45. The reduction line memory 44 outputs delayed horizontal-scanning-line data DPD that is delayed by predetermined clock cycle numbers, which is inputted into the horizontal reduction arithmetic circuit 43. By performing the reduction process of averaging etc., the horizontal reduction arithmetic circuit 43 can obtain the after-reduction horizontal-scanning-line data RSZPD corresponding to the first horizontal synchronization signal for data transmission EHSYNC1 using both the reduced horizontal-scanning-line data RPD and the delayed horizontal-scanning-line data DPD that are inputted (FIG. 2).

The after-reduction horizontal-scanning-line data RSZPD outputted from the vertical reduction arithmetic circuit 45 is inputted into the line memory output selector 41. The line memory output selector 41 is a selector that enables the after-reduction horizontal-scanning-line data RSZPD to be stored in one of the first line memory 36 through the third line memory 38 sequentially and cyclically in response to the first horizontal synchronization signal for data transmission EHSYNC1 (Arrows YY8 through YY10).

The enlargement operation unit 31 provided in the image signal output unit 3 performs the enlargement process of enlarging the after-reduction horizontal-scanning-line data RSZPD both in the vertical direction and in the horizontal direction. The line memory input selector 46 performs an operation of selecting two not-updated line memory devices among the first line memory through the third line memory in response to the first horizontal synchronization signal for data transmission EHSYNC1. For example, at time T17, the line memory input selector 46 selects the first line memory 36 and the second line memory 37, whose outputs are inputted into the enlargement arithmetic circuit 47, respectively. The enlargement arithmetic circuit 47 performs the enlargement process of weighted interpolation, averaging, etc. on the after-reduction horizontal-scanning-line data RSZPD (data amount corresponding to 300 (clk)) stored in the first line memory 36 and the second line memory 37 to enlarge that data three times in the horizontal direction (data amount becoming 900 (clk)), obtaining the transmitting horizontal-scanning-line data EDATA. Then, in response to the input of the horizontal synchronization signal for data transmission EHSYNC, the enlargement arithmetic circuit 47 outputs transmitting horizontal-scanning-line data EDATA (Arrows YY11 through YY13). By the above process, it becomes possible to transfer the transmitting horizontal-scanning-line data EDATA obtained by performing the reduction and enlargement processes on the input horizontal-scanning-line data PD to external devices, such as a host and a display device, by using the horizontal synchronization signal for data transmission EHSYNC obtained by adjusting the input horizontal synchronization signal HD according to the reduction and enlargement processes.

Note that, since the cycle-number set value CS in the cycle-number setting unit 20 can be set arbitrarily, the cycle-number set value CS can be set to a cycle-number set value CS2 that is smaller than the cycle-number set value CS1, as shown in FIG. 3, rather than the cycle-number set value CS1 (FIG. 2) that divides equally the transmitting horizontal-synchronization-signal interval time TC1. In this particular case, the second horizontal synchronization signals for data transmission EHSYNC2 are inserted in the transmitting horizontal-synchronization-signal interval time TC1 in such a way as to be not uniformly but unevenly distributed. Then, an empty time MS is obtained for every horizontal synchronization signal for data transmission EHSYNC. Once the empty time MS is reserved, other processes than the image processing can be performed in the time, and consequently this method brings advantages that hardware resources can be saved and used effectively.

As described above in detail, the image processing circuit 1 according to the first embodiment makes possible a control of performing the reduction (resizing) process and the enlargement process simultaneously by combining the thinning-out process of thinning out the input horizontal synchronization signal HD and the addition process of adding the second horizontal synchronization signal for data transmission EHSYNC2 at a specified cycle. The horizontal synchronization signal for data transmission EHSYNC after the reduction process and enlargement processes can be obtained. That is, it becomes possible to reduce (resize) the image data being inputted in real time in the vertical direction and/or in the horizontal direction so that it is converted to data suited to an image display device at a destination, enlarge it by a predetermined ratio, and send and display it on the image display device at the destination in real time simultaneously.

Moreover, a predetermined number of the second horizontal synchronization signals for data transmission EHSYNC2 can be inserted so that the cycle-number set value CS becomes a maximum by using, as a reference, the transmitting horizontal-synchronization-signal interval time TC1 of the first horizontal synchronization signal for data transmission EHSYNC1 after the reduction process. Accordingly, unlike the case where the signal interval time C1 of the input horizontal synchronization signal HD before the reduction process is used as a reference, the cycle-number set value CS can be set to a maximum value. Consequently, a spare time ST (FIG. 2) that allows the transmitting horizontal-scanning-line data EDATA to be enlarged in the horizontal direction can be reserved sufficiently, and hence the horizontal enlargement ratio can be increased.

Furthermore, since the spare time ST that allows the transmitting horizontal-scanning-line data EDATA to be enlarged in the horizontal direction can be reserved sufficiently, narrowing the signal interval time C1 of the input horizontal synchronization signal HD becomes possible. Consequently, an input rate of the input horizontal-scanning-line data PD can be increased, and hence it becomes possible to make a moving picture move smoothly.

In addition, by setting the cycle-number set value to a cycle-number set value CS2 that is smaller than the cycle-number set value CS1 at which the second horizontal synchronization signals for data transmission EHSYNC2 have a maximum time interval, the second horizontal synchronization signals for data transmission EHSYNC2 can be inserted in the transmitting horizontal-synchronization-signal interval time TC1 in such a way as to be unevenly distributed. Then, it becomes possible to have the empty time MS for every horizontal synchronization signal for data transmission EHSYNC. Once the empty time MS is reserved, other processes than the image processing can be performed in the time. Therefore, saving and efficient use of hardware resources becomes possible.

Second Embodiment

A second embodiment of this invention will be explained using FIG. 4. The second embodiment is an embodiment in which the vertical reduction (resizing) ratio is 2/5 (times) and a complex thinning-out process of thinning out a varying number of input horizontal synchronization signals becomes necessary. Here, it is assumed that the resizing (reduction) ratio in the horizontal direction is 1/4 (times) and the enlargement ratio is 3 (times) both in the horizontal direction and in the vertical direction.

The operation of the reducing unit 10 will be described. In this embodiment, the reduction ratio of the inputted image data is 2/5 (times) in the vertical direction. Consequently, every five adjacent lines of the input horizontal synchronization signals HD constitute the second horizontal-synchronization-signal unit HSU2 (FIG. 4). Moreover, the reduction-ratio set value RS corresponding to a reduction ratio of 2/5 (times) is set in the register of the reduction-ratio setting unit 15. The reduction-ratio set value RS is a value indicating a predetermined identification position of the input horizontal synchronization signal HD to be thinned out in the second horizontal-synchronization-signal unit HSU2. More specifically, in the second embodiment, the reduction-ratio set value RS designates the predetermined identification positions so that the thinning-out is performed when the horizontal-synchronization-signal count value HDCNT is one of "2, 4, and 5".

The horizontal-synchronization-signal counter 25 is a 5-counter for counting an input of the input horizontal synchronization signal HD and indicating "1" through "5" cyclically, outputting the count value as a horizontal-synchronization-signal count value HDCNT (FIG. 4). The horizontal-synchronization-signal count value HDCNT is inputted into the thinning-out decoder 26, and compared with the reduction-ratio set value RS by a comparator not shown in the figure. When the comparison result indicates coincidence, the thinning-out decoder 26 will output a high level thinning-out request signal EHSYNCTH for requesting the signal to be thinned out. Consequently, as shown in FIG. 4, the thinning-out request signal EHSYNCTH is set high according to a value of "2, 4, and 5" of the horizontal-synchronization-signal count value HDCNT.

At times T22 and T24, since the thinning-out request signal EHSYNCTH is low (thinning-out being inhibited), the horizontal-synchronization-signal generating unit 13 outputs the first horizontal synchronization signal for data transmission EHSYNC1 in response to the input horizontal synchronization signal HD being inputted into the horizontal-synchronization-signal generating unit 13 (Arrows YY21 and YY22). At times T23, T25, and T26, since the thinning-out request signal EHSYNCTH is high (thinning-out being requested), the horizontal-synchronization-signal generating unit 13 performs the thinning-out process, and does not output the first horizontal synchronization signal for data transmission EHSYNC1.

Repeating the same operation after this makes it possible to generate the first horizontal synchronization signals for data transmission EHSYNC1 that were thinned out in response to the count value of "2, 4, and 5" for the second horizontal-synchronization-signal unit HSU2 consisting of five adjacent lines of the input horizontal synchronization signals HD. The enlargement process in the enlarging unit 11 and its downstream is the same as that of the first embodiment, its explanation is omitted in this section.

Here, as the signal interval time between adjacent first horizontal synchronization signals for data transmission EHSYNC1, there are two kinds: the transmitting horizontal-synchronization-signal interval time TC1 (data clock: 1526× 4=6104 (clk)); and the transmitting horizontal-synchronization-signal interval time TC2 (data clock: 1526×6=9156 (clk)) (FIG. 4). In this case, if a quotient (2034 (clk)) obtained by dividing the transmitting horizontal-synchronization-signal interval time TC1 having a minimum number of clocks by an enlargement ratio k (=3) is set as the cycle-number set value CS1, it becomes possible to insert two lines of the second horizontal synchronization signals for data transmission EHSYNC2 so that they divides TC1 into three each having a maximum time interval (FIG. 4).

As described above in detail, according to the second embodiment, it becomes possible to perform an irregular thinning-out process in which thinning out of one line and two lines of the first horizontal synchronization signals for data transmission EHSYNC1 are executed alternately each time the first horizontal synchronization signal for data transmission EHSYNC1 is transmitted once in response to the input of the input horizontal synchronization signal HD. Thus, a reduction (resizing) by a factor of 2/5 is realized. Moreover, it becomes possible to realize a reduction ratio of n/5 (times) by setting a set value of the reduction-ratio set value RS to any of 1 through 5 and selecting signals to be thinned out using an arbitrary combination. Incidentally, it is needless to say that if the horizontal-synchronization-signal counter 25 is an m-counter for counting the horizontal synchronization signal and indicating "1" through "m" (m: natural number) cyclically, an arbitrary reduction ratio of n/m (times) can be set.

Third Embodiment

A third embodiment of this invention will be described using FIGS. 5 and 6. A horizontal-synchronization-signal output unit 2a incorporated in an image processing circuit 1a of the third embodiment is shown in FIG. 5. The image processing circuit 1a performs the enlargement process on the input horizontal synchronization signals HD in its enlarging unit 11 and subsequently performs the reduction process thereon in its reducing unit 10.

The input horizontal synchronization signal HD is inputted into the cycle counter 21 of the enlarging unit 11. The input horizontal synchronization signal HD and the second horizontal synchronization signal for data transmission EHSYNC2 are inputted into the composing unit 12. The composing unit 12 outputs a third horizontal synchronization signal for data transmission EHSYNC3 obtained by composing the input horizontal synchronization signal HD and the second horizontal synchronization signal for data transmission EHSYNC2. The third horizontal synchronization signal for data transmission EHSYNC3 is inputted into the horizontal-synchronization-signal generating unit 13 and the horizontal-synchronization-signal counter 25 of the reducing unit 10. Other compositions than the above mentioned are the same as those of the image processing circuit 1 of the first embodiment 1, their explanations are omitted in this section.

The operation of the horizontal-synchronization-signal output unit 2a will be explained using FIGS. 5 and 6. The case where the enlargement ratio is 3 (times) in the both horizontal and vertical directions, and the resizing (reduction) ratios are 1/4 (times) in the horizontal direction and 1/2 (times) in the vertical direction will be explained. The operation of the enlarging unit 11 will be explained. The enlarging unit 11 is a circuit for enlarging the input horizontal-scanning-line data PD in the vertical direction. First, the enlargement-ratio setting unit 24 sets the horizontal-synchronization-signal insert-number set value ZS. From a vertical enlargement ratio of 3 (times), the image processing circuit knows that two lines of the second horizontal synchronization signals for data transmission EHSYNC2 should be inserted in each signal interval time C1 between adjacent input horizontal synchronization signals HD. Consequently, the horizontal-synchronization-signal insert-number set value ZS is set to 2 (times).

Moreover, the cycle-number setting unit 20 sets a cycle-number set value CS3 that is a set value demanding that the second horizontal synchronization signals for data transmission EHSYNC2 have a maximum time interval. The cycle-number set value CS3 is determined by setting the number of data clocks (1017 (clk)) obtained by dividing the number of data clocks of the signal interval time C1 (1526×2=3052 (clk)) by an enlargement ratio of 3 (giving a quotient) to its set value.

Then, the same operation as the first embodiment is performed in the enlarging-horizontal-synchronization-signal generating unit 22, the remaining number counter 23, and the enlargement-ratio setting unit 24. Accordingly, the second horizontal synchronization signal for data transmission EHSYNC2 can be generated (FIG. 6) in such a way as to divide the signal interval time C1 of the input horizontal synchronization signals HD by 3 because the cycle-number set value CS3 has been determined.

The operation of the composing unit 12 (FIG. 5) will be described. The input horizontal synchronization signal HD and the second horizontal synchronization signal for data transmission EHSYNC2 are inputted into the composing unit 12. The composing unit 12 composes a signal by ANDing the first horizontal synchronization signal for data transmission EHSYNC1 with the second horizontal synchronization signal for data transmission EHSYNC2, and outputs it as the third horizontal synchronization signal for data transmission EHSYNC3 (FIG. 6). Accordingly, three-fold enlargement of the image data in the vertical direction is performed.

The operation of the reducing unit 10 will be described. The reduction-ratio set value RS corresponding to a reduction ratio is set in the register of the reduction-ratio setting unit 15. The case where the thinning-out process is performed with a reduction ratio of n/m (times) on consecutive (m−n) lines or less of, and yet two lines or more of the third horizontal synchronization signals for data transmission EHSYNC3 out of the third horizontal synchronization signals for data transmission EHSYNC3 that constitute the horizontal-synchronization-signal unit will be explained. Here, when n=4 and m=8, adjacent eight lines of the third horizontal synchronization signals for data transmission EHSYNC3 constitute the third horizontal-synchronization-signal unit HSU3 (FIG. 6). Moreover, the case where the thinning-out process is performed on consecutive four lines of the third horizontal synchronization signals for data transmission EHSYNC3 will be described.

The horizontal-synchronization-signal counter 25 is an 8-counter for counting an input of the third horizontal synchronization signal for data transmission EHSYNC3 and indicating "1" through "8" cyclically, outputting its count value as the horizontal-synchronization-signal count value HDCNT (FIG. 6). The horizontal-synchronization-signal count value HDCNT is inputted into the thinning-out decoder 26, and compared with the reduction-ratio set value RS by a comparator not shown in the figure. When the comparison result indicates coincidence, the thinning-out decoder 26 outputs a high level thinning-out request signal EHSYNCTH for requesting the signal to be thinned out. Consequently, as shown in FIG. 6, the thinning-out request signal EHSYNCTH is set high according to values of "5, 6, 7, and 8" of the horizontal-synchronization-signal count value HDCNT.

At time T31 to time T32, since the thinning-out request signal EHSYNCTH is low, the horizontal-synchronization-signal generating unit 13 outputs the horizontal synchronization signal for data transmission EHSYNC (time domain A10) in response to an event that the third horizontal synchronization signal for data transmission EHSYNC3 is inputted into the horizontal-synchronization-signal generating unit 13. Moreover, at time T33 to time T34, since the thinning-out request signal EHSYNCTH is high, the horizontal-synchronization-signal generating unit 13 performs the thinning-out process, and does not output the horizontal synchronization signal for data transmission EHSYNC (time domain A11).

Repeating the same operation after this makes it possible to repeat the actions of: counting four lines of the third horizontal synchronization signals for data transmission EHSYNC3 for the third horizontal-synchronization-signal unit HSU3 consisting of the adjacent eight lines of the input horizontal synchronization signals HD; outputting the horizontal synchronization signal for data transmission EHSYNC; and thinning out the next consecutive four lines of the third horizontal synchronization signals for data transmission EHSYNC3. Thus, reduction (resizing) by a factor of 1/2 is achieved and at the same time the horizontal synchronization signals for data transmission EHSYNC are transmitted in such a way as to be unevenly distributed, and consequently an empty time MS1 is obtained.

As described above in detail, according to the third embodiment, when performing the reduction process with a reduction ratio of n/m (times) after the enlargement process, it is possible to perform such an irregular thinning-out process that the thinning-out process is repeated on consecutive (m−n) lines or less of, and yet two lines or more of the third horizontal synchronization signals of data transmission EHSYNC3, out of the third horizontal synchronization signals of data transmission EHSYNC3 that constitute the horizontal-synchronization-signal unit. Thus, the horizontal synchronization signals for data transmission EHSYNC are transmitted in such a way as to be unevenly distributed, whereby the empty time MS1 is obtained. Then, by adopting a method in which enlargement is performed and subsequently reduction (thinning-out) is performed, the thinning-out process can be performed on the third horizontal synchronization signals for data transmission EHSYNC3 after the enlargement rather than performing it on the input horizontal synchronization signals HD. Thus, it becomes possible to set the empty time MS to a time longer than a signal interval time C1 arbitrarily without depending on the signal interval time C1 of the input horizontal synchronization signal HD. Once the empty time MS1 is set longer, various processes other than the imaging process can be performed in the empty time MS1. Therefore, saving and effective use of hardware resources become possible with a higher degree of freedom.

It should be noted that this invention is not limited to the above-mentioned embodiments. Needless to say, various improvements and modifications are possible without departing from the scope of this invention. In the first embodiment, it was specified that the time interval between adjacent second horizontal synchronization signals for data transmission EHSYNC2 was integer multiples of the cycle-number set value CS1 and the second horizontal synchronization signal of data transmission EHSYNC2 was inserted therein at regular intervals. However, a manner of insertion is not limited to this form. Needless to say, the time interval between the second horizontal synchronization signals of data transmission EHSYNC2 can be altered arbitrarily by changing the cycle-number set value CS arbitrarily. Accordingly, for example, in the case where a processing time varies for each image data, if a control of narrowing the time interval between the second horizontal synchronization signals for data transmission EHSYNC2 to satisfy a higher processing speed is adopted, an empty time can be reserved in the horizontal synchronization signal for data transmission EHSYNC. Then, other processes than the image processing can be performed in the empty time, and hence saving and effective use of hardware resources become possible.

Although in this embodiment, the case where the input image data was enlarged by an enlargement ratio k (k: natural number) in the vertical direction was explained. Needless to say, the enlargement ratio is not limited to nonnegative integers, and can be expanded to a value of k/j (times) (k, j: natural numbers, where k>j). In this case, all that is necessary is just to compose an enlarging-horizontal-synchronization-signal unit consisting of adjacent j-lines of the input horizontal synchronization signals and insert (k−j) lines of the enlarging horizontal synchronization signals between the input horizontal synchronization signals in the enlarging-horizontal-synchronization-signal unit. At this time, the circuit must take a manner of changing the horizontal-synchronization-signal insert-number set value ZS outputted from the enlargement-ratio setting unit 24 according to the input of the input horizontal synchronization signal HD. For example, in the case of an enlargement ratio of 3/2 (times), the horizontal-synchronization-signal insert-number set value ZS needs to be changed alternately as 1, 2, 1, 2, . . . each time the input horizontal synchronization signal HD is inputted. Accordingly, the second horizontal synchronization signal for data transmission EHSYNC2 can be inserted between the input horizontal synchronization signals HD in such a way: HD–EHSYNC2–HD–EHSYNC2 –EHSYNC2–HD–EHSYNC2– HD . . . , namely in an alternate manner, whereby it becomes possible to realize an enlargement ratio of 3/2 (times).

Note that, in the third embodiment, when the reduction process is performed after the enlargement process, the horizontal synchronization signals for data transmission EHSYNC are transmitted in such a way as to be unevenly distributed and thereby the empty time MS1 is obtained. However, a manner of transmission is not limited to this form. Needless to say, even when the reduction process is performed after the enlargement process, the horizontal synchronization signal for data transmission EHSYNC can be transmitted uniformly. For example, in the case of a reduction ratio of 1/2 (times), the signal interval of the horizontal synchronization signals for data transmission can be uniform after the thinning-out process by a method in which the two adjacent lines of the third horizontal synchronization signals for data transmission EHSYNC3 are assigned to constitute one horizontal-synchronization-signal unit, and one line of the third horizontal synchronization signal for data transmission EHSYNC3 in that unit is thinned out.

Note that the enlarging unit 11 is one example of the enlarging circuit, the reducing unit 10 is one example of the reducing circuit, the input horizontal synchronization signal HD is one example of the input horizontal synchronization signal, the second horizontal synchronization signal for data transmission EHSYNC2 is one example of the enlarging horizontal synchronization signal, the third horizontal synchronization signal for data transmission EHSYNC3 is one example of the input horizontal synchronization signal and enlarging horizontal synchronization signal, and the cycle-number set values CS1 to CS3 are one example of the predetermined intervals.

According to this invention, it becomes possible to provide the image processing circuit that is endowed with a capability of performing both the reduction (resizing) process and the enlargement process on the input horizontal-scanning-line data flowing incessantly in synchronization with the input horizontal synchronization signal and subsequently adjusting the horizontal synchronization signals when the data is transferred to external devices, such as a host and a display device, and thereby makes it possible to transfer the data in real time. That is, it is possible for the image processing circuit to perform the following simultaneously: resizing the image data being inputted in real time so that the image data is converted to data suited to an image display device at its destination; enlarging the data by a predetermined ratio; and transmitting the data in real time to the image display device at the destination, which allows the image display device to display the data thereon.

What is claimed is:

1. An image processing circuit to which image data is inputted in synchronization with an input horizontal synchronization signal, comprising:
   an enlarging circuit that inserts at least one of enlarging horizontal synchronization signals into a signal interval time between the input horizontal synchronization signals adjacent to each other; and
   a reducing circuit that performs a thinning-out process of masking the input horizontal synchronization signals and/or the enlarging horizontal synchronization signals that were selected out of a horizontal-synchronization-signal unit provided with a predetermined number of the input horizontal synchronization signals and/or the enlarging horizontal synchronization signals adjacent to one another.

2. The image processing circuit according to claim 1, wherein when the input image signal data is enlarged by an enlargement ratio k (k: natural number) in the vertical direction, (k−1) lines of the enlarging horizontal synchronization signals are inserted in the signal interval times each between the input horizontal synchronization signals at predetermined intervals.

3. The image processing circuit according to claim 2, wherein the enlarging circuit comprises:
   a cycle counter for measuring the signal interval time between the input horizontal synchronization signals; and
   a cycle number setting unit for setting the cycle-number set value,
   the predetermined interval being obtained each time the counter value of the cycle counter coincides with the cycle-number set value.

4. The image processing circuit according to claim 3, wherein the cycle-number set value is a value that divides equally the signal interval time between the input horizontal synchronization signals according to the enlargement ratio k.

5. The image processing circuit according to claim 3, wherein when the signal interval times between the input horizontal synchronization signals are different, the cycle-number set value is a value that divides equally a minimum of the signal interval times between the input horizontal synchronization signals.

6. The image processing circuit according to claim 1, wherein:
   when the image data is reduced by a reduction ratio of n/m (n, m: natural numbers, where n<m) in the vertical direction, the horizontal-synchronization-signal unit consists of adjacent m-lines of the input horizontal synchronization signals and/or the enlarging horizontal synchronization signals, and
   the thinning-out process is performed on (m−n) lines of the input horizontal synchronization signals and/or the enlarging horizontal synchronization signals in the horizontal-synchronization-signal unit.

7. The image processing circuit according to claim 6, wherein the reducing circuit comprises:
   an horizontal-synchronization-signal counter that distinguishes the input horizontal synchronization signals and/or the enlarging horizontal synchronization signals in the horizontal-synchronization-signal unit; and
   a reduction-ratio setting unit that sets a predetermined identification position of the (m−n) lines of the input horizontal synchronization signals and/or the enlarging horizontal synchronization signals in the horizontal-synchronization-signal unit,
   the thinning-out process being performed on the input horizontal synchronization signals and/or the enlarging horizontal synchronization signals that correspond to the predetermined identification position.

8. The image processing circuit according to claim 6, wherein the thinning-out process is performed on consecutive (m−n) lines or less of, and yet two lines or more of the input horizontal synchronization signals and/or the enlarging horizontal synchronization signals in the horizontal-synchronization-signal unit.

9. The image processing circuit according to claim 1, wherein an output of the reducing circuit is inputted into the enlarging circuit.

10. The image processing circuit according to claim 1, wherein an output of the enlarging circuit is inputted into the reducing circuit.

11. An image processing method in which image data is inputted in synchronization with an input horizontal synchronization signal, comprising the steps of:

inserting enlarging horizontal synchronization signals between the input horizontal synchronization signals adjacent to each other; and performing a thinning-out process of masking the input horizontal synchronization signals and/or the enlarging horizontal synchronization signals that were selected out of a horizontal-synchronization-signal unit provided with a predetermined number of the input horizontal synchronization signals adjacent to one another and/or the enlarging horizontal synchronization signals.

* * * * *